United States Patent [19]

Beristain et al.

[11] 3,774,760

[45] Nov. 27, 1973

[54] SLUDGE DEWATERING APPARATUS AND PROCESS

[75] Inventors: Charles D. Beristain; Barrie K. Nixon; Robert J. Kiefer, all of Richmond, Va.

[73] Assignee: Westinghouse Electric Corporation, Pittsburgh, Pa.

[22] Filed: Sept. 29, 1971

[21] Appl. No.: 184,675

[52] U.S. Cl............. 210/66, 100/118, 210/73, 210/386, 210/401, 210/396
[51] Int. Cl............................................. B01d 33/04
[58] Field of Search............. 210/66, 386, 396, 210/400, 401, 499, 73; 100/116, 118, 151–154

[56] References Cited
UNITED STATES PATENTS

| 3,699,881 | 10/1972 | Levin et al.......................... 210/386 |
| 3,459,122 | 8/1969 | Pastoors et al..................... 210/400 |
| 3,375,932 | 4/1968 | Ishigaki............................. 210/401 |
| 3,138,088 | 6/1964 | Foth.................................. 210/386 |
| 3,426,908 | 2/1969 | Davis et al......................... 210/401 |
| 3,613,564 | 10/1971 | Wheeling et al.................... 210/386 |

Primary Examiner—Samih N. Zaharna
Assistant Examiner—Robert H. Spitzer
Attorney—A. T. Stratton et al.

[57] ABSTRACT

A process and apparatus for sludge dewatering including gravity screening and capillary dewatering wherein an endless belt of a screen-like material and an endless belt of a capillary material are selectively functionally utilized separately and in close proximity to effectuate the steps of the process including a repetitive dewatering of the belt as it becomes saturated. The repetitive dewatering step proceeds with the screen-like belt supporting the sludge while the capillary belt is separately compressed, or otherwise dewatered. The process and apparatus further includes a final sludge dewatering section wherein the screen-like belt and the capillary belt are similarly separated.

9 Claims, 1 Drawing Figure

PATENTED NOV 27 1973 3,774,760
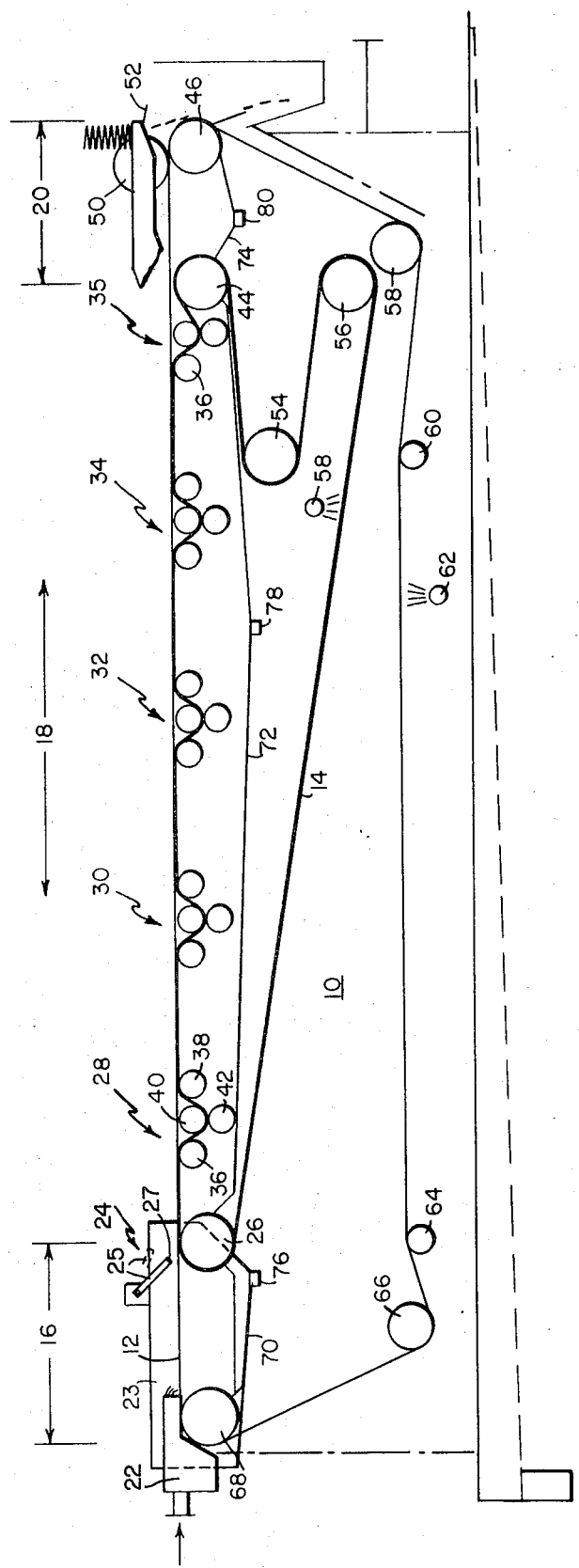

SLUDGE DEWATERING APPARATUS AND PROCESS

BACKGROUND OF THE INVENTION

This invention pertains to processes and apparatus for dewatering sludges and more particularly to such systems for dewatering sludges primarily through the application of capillary force produced by porous materials.

Sludges include those mixtures of particulate matter and water generally attained in the treatment of waste waters including domestic sewage and industrial waste or in water treatment plants. The sludges may comprise primary sludge, secondary or activated sludge, digested sludge, alum sludge, lime sludge and mixtures of the above sludges.

Sludges have been conventionally dewatered by treatment systems including vacuum filtration, centrifugation, and pressure filtration. Each of the systems suffer from inherent deficiencies. For example, vacuum filtration requires an elevated concentration of particulate matter in the sludge for efficient operation. Centrifugation requires a large power consumption, and pressure filtration requires excess washing to maintain any respectable treating capacity.

Capillary belts have been subject to repeated experimentation since they do not suffer from the particularized deficiencies associated with the above systems. Capillary belts are evaluated as to the volume of sludge feed they can handle (hydraulic loading), final solids concentration, and the quality of the supernatant. These parameters are all related to the capillary force a belt can develop.

The capillary force developed is basically a function of the number of pores and their size and the wetting characteristics of the liquid. Although belt materials are at least theoretically known which can maximize capillary force, above a certain level the force developed becomes self-defeating in the sense that the water cannot be removed from the belt. Any capillary belt utilized must effect a compromise between its ability to absorb water and its ability later to discharge this absorbed water by the application of some externally applied force.

A possible solution to the inherent limitation on useful capillary force, might be to reuse each section of the belt much in the manner in which a housewife uses a sponge, i.e., absorb liquid, squeeze liquid from sponge, absorb more liquid, etc. However, this approach can also be self-defeating since pressing the sludge into the belt can blind the pores of the belt with particles. Moreover, disturbing the sludge layer while it still contains considerable water can be detrimental to the continued dewatering of the sludge.

SUMMARY OF THE INVENTION

In accordance with this invention, an endless belt of porous material capable of developing an adequate capillary force is cooperatively associated with an endless belt of screen-like material. The system basically includes a free water dewatering section, wherein the screen-like belt is utilized alone, a capillary dewatering section in which both belts are generally used in close proximity, and a final dewatering section in which the belts are once again acted upon separately. The capillary dewatering section also includes means for dewatering the capillary belt repetitively as it becomes saturated. This repetitive dewatering also takes place with the screen-like belt separated from the capillary belt.

Initially the sludge which is rather dilute and contains much free water is fed to the screen-like belt alone. It has been found that with an hydraulic head of approximately 2 inches that 20 to 45 percent of the free water can be drained from the sludge in 20 to 30 seconds. The partially dewatered sludge is then carried by this screen-like belt to a location where the screen-like belt and the capillary belt are placed in sufficiently close proximity that the capillary belt and aqueous liquid produce a capillary force which removes further water from the sludge. As the capillary belt becomes saturated the screen-like belt is separated therefrom and the capillary belt is treated either by compression or by the application of a vacuum to draw a substantial quantity of water therefrom. The screen-like belt and the capillary belts are then once again brought into close proximity so that the capillary force may remove still further water from the sludge. These steps are repeated a sufficient number of times to remove a high percentage of the water from the sludge. At the end of this repetitive process the screen-like member is once again separated from the capillary belt and the capillary belt is again treated to remove water therefrom. The screen-like belt wraps around its return roller a foot or so along the machine length. A compression roller is associated with the return roller to further dry the sludge. The surface of the compression roller is such that the now partially dry sludge preferentially sticks to the roller surface and may be scraped therefrom into a receptacle via the usual knife-edge.

The belt and screen then proceed to cleaning locations where water under pressure is sprayed on the surface of the capillary belt and the screen-like belt, respectively, from which locations the belts are conveyed to the inlet side of the apparatus and the process is repeated.

DESCRIPTION OF THE DRAWINGS

FIG. 1 is a schematic view of a sludge dewatering apparatus in accordance with the principles of this invention.

DESCRIPTION OF A PREFERRED EMBODIMENT

The following description is of an illustrative embodiment of the invention and it will be apparent to those working in the art that many modifications may be made thereto within the scope of the invention. Some of these modifications are included with the description of the preferred illustrative embodiment.

One example of a suitable sludge is activated sludge, as for example from a secondary clarifier of a domestic waste purification system, or such activated sludge mixed with primary feed such as that in municipal sewage systems. Such sludge is normally very dilute and may have a particulate content as low as 0.1 percent.

The basic system 10 has as its operative elements a screen-like belt 12 and a capillary belt 14 of a porous material; both of which elements will be described in greater detail later in this application. The screen-like belt 12 and the capillary belt 14 take the form of endless belts so as to facilitate the operation of the continuous process in which they are cooperatively associated. The apparatus basically includes a free water dewatering section 16, a capillary dewatering section 18, and a final dewatering section 20.

Initially the sludge feed which is normally very dilute and contains much free water which is easily removable is fed onto the screen-like belt 12 via a constant level reservoir-like device 22. As can be seen in FIG. 1, the screen-like member 12 is utilized without the capillary belt 14. It has been found that the greater the hydraulic head on this free water dewatering section 16 the more rapidly free water will drain through the screen-like member 12. However, the layer of sludge fed onto the capillary belt 14 must not be so thick as not to be readily dewatered. Means such as a container having a side wall illustrated at 23 are provided to permit a head to be created on member 12. A 2 inch head has been found to be sufficient to remove 20 to 45 percent of this free water in a matter of 20 to 30 seconds. However, higher heads may be found to be more efficient for some purposes.

An underflow weir 24, of conventional construction such as an adjustable wall means illustrated by reference character 25 adjustably mounted on container wall 23 having its free end 27 and spaced from screen 12, may be utilized at the end of the dewatering section 16. The spacing between screen 12 and weir end 27 serves to maintain the desired head and also to set the thickness of the sludge feed layer as the screen-like member 12 comes in contact with the capillary member 14. As can be seen, the capillary member 14 is fed underneath the screen-like member 12 over a large rotating drum 26. This manner of feed allows the settled layer of sludge created in the free water dewatering section to come in contact with the capillary belt 14 without disturbance. It has been found that any mixing or disturbing of the sludge at the entrance to the capillary belts 14 is detrimental to the dewatering process. In the capillary dewatering section 18, the screen-like belt 12 and the capillary belt 14 must be in close contact during those times in which a capillary force is desired to draw water from the sludge layer. The close proximity of the belts 12 and 14 may be achieved by supporting these belts at a plurality of roller locations. As will be explained, these roller locations also contain compression rollers which remove water from the capillary belt 14 as it becomes saturated.

An important feature of this invention is the construction of the capillary belt 14 which must produce sufficient capillary force to properly dewater the sludge while said force remains weak enough that the belt may be easily dewatered by compression rollers, or the other known dewatering means. The capillary belt 14 is preferably constructed from relatively inert synthetic fibers, e.g., nylon fibers, each fiber in this example being of approximately 4 ½ inches in length. The desired weight of the belt is approximately 7.1 oz. 1 ft². It is desired that the finished belt have between 85 and 95 percent voids. In this example, to achieve this goal, the individual fibers are approximately 43 microns in thickness. Preferably belt thickness is in the range of one-half to nine-sixteenths inch. The sheet is properly manufactured if it is capable of transferring water therethrough in a relatively short time under the influence of gravity alone when the amount of water, or similar liquid, on its top surface is approximately that amount which would overflow the sheet.

Because of the inherent limited hydraulic capacity of capillary belt materials, in accordance with this invention the capillary belt 14 is repeatedly dewatered as it becomes saturated during sludge dewatering runs. As can be seen from the illustrative embodiment, a plurality of dewatering sections designated by the numerals 28, 30, 32, 34 and 35 are provided in the capillary dewatering section 18 for removing water from the capillary belt 14 as it becomes saturated. Although five such sections 28, 30, 32, 34 and 35 are shown, a greater or fewer number of such sections may be utilized depending upon the rate of saturation of the capillary belt 14. It has been found desirable to place the dewatering locations 28, 30, 32, etc. closer together at the beginning of the capillary dewatering section 18 than at the end. This is due to the fact that as the sludge becomes dryer, it becomes progressively more difficult to remove water therefrom and thus requires more time for the capillary belt to become saturated. The dewatering sections 28, 30, 32, and 34 include guide rollers 36 and 38 and compression rollers 40 and 42. Dewatering of the belt 14 takes place with the screen-like member 12 proceeding over the rollers 36, 40 and 38 while the capillary belt 14 proceeds over the roller 36, between 14 once again comes into close proximity with the screen-like belt 12. 40 and 42, where compression and dewatering take place, and then back over roller 38, where the capillary belt 12.

The final capillary belt 14 dewatering section 35 also includes a roller set similar to sets 28, 30, 32 and 34 except that the roller 38 is replaced by a relatively large return roller 44 around which the capillary belt wraps to begin its return passage.

The screen-like belt 12 wraps around a return roller 46 which is displayed some distance in the belt moving direction from the capillary belt return roller 44.

A final dewatering of the layer of sludge previously dewatered by the free water dewatering section 16 and the capillary dewatering section 18 takes place as the screen-like member 12 proceeds over the screen return roller 46. One favorable technique evolved for effectuating this final dewatering is to situate a compression roller above and in spring loaded relationship with the return roller 46; which compression roller is designated by the numeral 50. The top compression roller 50 in this example is chain driven and is positioned so that a line through its axis of rotation is forward of a similar line through the axis of the return roller 46. This displacement of the axis of rotation of the rollers 46 and 50 effects a lead angle for the sludge as it comes in contact with the compression roller 50. If the top roller 50 is situated directly above the return roller 46, the sludge normally tends to collect in front of the top roller 50, and the roller 50 ceases to remove sludge. It has further been found that if the top roller 50 is made of a hard material which is finished to provide a smooth non-wetting surface, the compressed sludge will preferentially stick to the compression roller 50. This leaves the screen-like belt 12 much cleaner than would otherwise be the case. The supernatant is also cleaner, and the sludge may be removed from the compression roller 50 by such means as a knife edge, as designated by the numeral 52. The screen-like belt 12 is preferably constructed of inert synthetic woven fiber which provide openings therebetween which allow aqueous liquid to pass therethrough but not the usual range of particulate matter of which sludge is comprised.

Another approach to the final dewatering stage is to utilize the roller configuration of FIG. 1 but to allow these rollers to act on both the screen-like member 12 and the capillary belt member 14 while same are in contact. Using this approach, there is a slight reduction in capital cost of the equipment, however, a disadvantage of this approach is that some of the sludge material is forced through the screen 12 and into the capillary belt 14. This means that if the belt material 14 is not washed frequently, it may become blinded by the sludge particles and this could seriously affect its hydraulic capacity.

The final dewatering stage 20 may also take the form of an impervious endless belt positioned above the screen 12 and capillary belt 14. One advantage of using an impervious belt section is that it can be infinitely adjusted so that any lead angle can be effected; as is known to the art. Such an endless belt is let over a series of rollers; each successive roller being closer to the screen and belt combination and thus affecting a greater amount of compression.

A partial vacuum may also be used to accomplish a final dewatering. At first glance, this may appear to be merely the addition of vacuum filtration after a capillary dewatering stage. However, as those familiar with the vacuum filtration art will know, a major problem, with the practice of such art on such materials as activated sludge is that the "fines" in the feed material tend to clog and blind the filter material. However, a dewatering section 18, in accordance with this invention, builds up a precoat of sludge on the screen 12 such that "fines" cannot be drawn into the openings of the filter screen 12.

The capillary belt 14 after proceeding over the return roller 44 passes over additional rollers 54 and 56 to a high pressure spray cleaning location 58 where the belt 14 is sprayed on its "clean side" and then returns for another pass via roller 26. The screen-like belt 12 similarly proceeds via rollers 59 and 60 to a cleaner 62 and then via rollers 64, 66 and 68 to the front end of the apparatus 10. The belts 12 and 14 can be driven in any conventional manner, for example a chain and sprocket arrangement can be used to drive all the friction and drag points, i.e., by direct coupling to the rollers. The aqueous liquid which is separated from the sludge is preferably collected in three separate receptacles 70, 72, and 74 having drain lines 76, 78 and 80, respectively. The effluent from these drain lines can be directed to the plant effluent or to further treatment apparatus depending upon its particulate content and other known parameters.

The relatively dry sludge is collected in a receptacle 82 and may either be burned or used for land fill, as is known to the art.

We claim:

1. A process for dewatering a flowable material which includes suspended solids and water comprising the steps of:

feeding said flowable material onto the top surface of a moving endless screen belt having openings therein so sized as to retain substantially all of the suspended solids;

allowing the free water in the flowable material to drain through the belt;

conveying said flowable material; having been partially dewatered, while still on the surface of said moving screen belt into sufficiently close proximity with the top surface of a moving capillary belt having pores so sized as to develop a capillary force with respect to the remaining water in said flowable material as to further dewater the same;

repeatedly diverting the capillary belt away from the moving screen belt;

squeezing the absorbed water out of the capillary belt each time it is moved away from the screen belt; and transferring the substantially dewatered flowable material from the screen belt to a roller for subsequent discharge into a container.

2. The process of claim 1 including squeezing the layer of solids formed on the screen belt after it is separated from the capillary belt to further remove water therefrom.

3. The process of claim 1 including directing a high pressure water spray against the said top surface of the screen belt and against the bottom surface of the capillary belt after removal of solids from the screen belt for further removing any solids adhering to said belts; and squeezing any remaining sprayed water from said belts.

4. Apparatus for removing water from a flowable material comprising:

a base supporting spaced upstanding members;

first rotatable means mounted on each of said members;

an endless porous screen belt extending between the members and removably mounted on said spaced rotatable means and arranged such that the rotatable means moves the belt between said members in an upper run forwardly in a horizontal plane, and in a lower run in a reverse direction;

flowable material feed means adjacent one of said members for feeding flowable material onto said screen belt which allows free water in the flowable material to drain through the belt pores;

second rotatable means mounted on each of said members between said first rotatable means;

an endless capillary belt made of relatively inert synthetic fibers having pores therein of a size sufficient to develop a capillary force capable of absorbing water from the flowable material while still having the ability to later release such water by the application of an external force;

said capillary belt being mounted on said second rotatable means which moves the capillary belt in an upper run and horizontally underneath the screen belt with its upper surface in contact with the lower surface of the screen belt thereby effecting by capillary force, the transfer of additional water from the flowable materal on the porous screen belt to the capillary belt; and capillary belt dewatering means mounted on said base beneath the capillary and screen belts for periodically removing the absorbed water from the capillary belt during the time the belts move horizontally in the upper run between said members.

5. Apparatus according to claim 4 wherein said flowable material feed means comprising a container having an inlet and an outlet through which flowable material is discharged onto said screen belt;

side walls on said container extending parallel to said belt for containing the flowable material on said belt; and flowable material levelling means on said container for maintaining the flowable material at a predetermined level, thereby causing water in said flowable material to freely fall through the screen belt before the screen belt contacts the capillary belt.

6. Apparatus according to claim 4 wherein the capillary belt dewatering means includes at least one combined belt support and dewatering device, the belt support portion being mounted to contact the inner surface of the capillary belt, a belt diverting portion in said dewatering device which directs the capillary belt downwardly from the horizontal plane for passage through the dewatering device which squeezes water from the belt.

7. Apparatus according to claim 4 wherein said capillary belt dewatering means comprises multiple combined belt support and dewatering devices, each of said device including a pair of spaced rollers positioned to support the screen and capillary belts as they move in said horizontal planes;

a pair of vertically disposed belt squeezing rollers between the support rollers, said squeezing rollers being spaced from each other a distance less than the thickness of the capillary belt, the support and squeezing roller arrangement being such that the capillary belt moves over the top of one support roller then downwardly for movement between the squeezing rollers which squeezes water from the belt, and then over the top of the other support roller to resume movement in said horizontal plane.

8. Apparatus according to claim 7 wherein the feed means is mounted on one of said members and above the first rotatable means thereon and in a position to discharge flowable material onto the screen belt, so that free water in the flowable material is permitted to flow through the screen from the time the material is discharged onto the screen belt until the latter contacts the capillary belts.

9. Apparatus according to claim 8 wherein the first rotatable means on said base opposite the feed means is spaced a horizontal distance from the second rotatable means thereon to permit the screen belt to separate from the capillary belt;

said first rotatable means comprising a compression set of rollers through which the screen belt moves for further dewatering the flowable material and simultaneously transferring the flowable material to one of the compression rollers; and scraper means adjacent said compression rollers for removing solid dewatered material from said screen belt.

* * * * *